United States Patent [19]
Yamamoto et al.

[11] Patent Number: 6,010,757
[45] Date of Patent: Jan. 4, 2000

[54] SURFACE COATING COMPOSITION

[75] Inventors: Tetsuya Yamamoto, Suita; Akio Naka, Takatsuki; Yukiko Nishio, Owariasahi, all of Japan

[73] Assignee: Nippon Shokubai Co., Ltd., Osaka, Japan

[21] Appl. No.: 08/935,109

[22] Filed: Sep. 29, 1997

[30] Foreign Application Priority Data

Mar. 31, 1997 [JP] Japan .................................. 9-081348

[51] Int. Cl.[7] .................................................. C09K 19/00
[52] U.S. Cl. ........................... 428/1; 428/413; 428/425.5; 524/730; 524/755; 524/772; 524/773
[58] Field of Search ........................... 428/1, 413, 425.5; 524/730, 755, 772, 773

[56] References Cited

U.S. PATENT DOCUMENTS

| 3,166,527 | 1/1965 | Ender . |
| 3,271,331 | 9/1966 | Ender . |
| 3,287,160 | 11/1966 | Ender . |
| 5,728,770 | 3/1998 | Yamamoto et al. . |

FOREIGN PATENT DOCUMENTS

| 35-16031 | 10/1960 | Japan . |
| 59-223460 | 12/1984 | Japan . |
| 7-104522 | 4/1995 | Japan . |
| 7-160058 | 6/1995 | Japan . |

*Primary Examiner*—Duc Truong
*Attorney, Agent, or Firm*—Oblon, Spivak, McClelland, Maier & Neustadt, P.C.

[57] ABSTRACT

The present invention provides a surface coating composition including: an organometallic comound (I) and/or a hydrolytic condensation product thereof: an organic compound (II) having a primary and/or secondary amino group in its molecule; and a compound (III) having a functional group reactable with the amino group in its molecule. The surface coating composition is capable of forming a coating layer which exhibits excellent gas barrier properties, transparency, and flexibility. A resin molding formed with the coating layer is preferably used as a wrapping material and a substrate for liquid crystal display device.

22 Claims, 1 Drawing Sheet

SURFACE COATING COMPOSITION

BACKGROUND OF THE INVENTION

The present invention relates to a surface coating composition which is capable of forming a coating layer having excellent gas barrier properties, transparency, and flexibility, and resin moldings, wrapping materials, substrates of liquid crystal displays, and liquid crystal display devices including the substrates which have the coating layer.

For wrapping materials, various physical properties are required. For example, the Japan Industrial Standard No. Z 1707 defines the performances and physical properties required for food wrap plastic films by classifying them into grade classes. The required performances and physical properties depend on the food to be wrapped, and examples thereof include: mechanical properties such as tensile strength, elongation, and impact strength; heat-sealing properties; low temperature resistance; heat resistance; resistance to oils and greases. In addition to the above, the gas barrier properties such as moisture permeability (water vapor permeability), oxygen permeability, and carbon dioxide permeability are required in general. The gas barrier properties are important properties not only for food wrap materials but also for various wrapping materials for phamaceuticals, electronic components, and the like.

Known methods for giving gas barrier properties to resin moldings such as plastic films and plastic sheets include: (1) the method of forming a moldings by using a gas-impermeable material such as ethylene-vinyl alcohol copolymer, vinylidene chloride copolymer, aromatic nylon, and the like; (2) the method of laminating or coating such a gas-impermeable material on other materials; (3) the method of laminating an aluminum foil on a film material; and (4) the method of depositing a metal oxide.

However, of the gas-impermeable material used in method (1), ethylene-vinyl alcohol copolymer and aromatic nylon have the problem that the gas-barrier properties significantly deteriorate with moisture adsorption due to its poor moisture resistance. Vinylidene chloride copolymers have chlorine atoms and thus might cause environmental pollution. In method (3), an aluminum foil-laminated film makes a packaged content invisible from the outside. In method (4), a metal-deposited film has the problem that, due to its poor flexibility, cracks easily occur in the deposited layer during packaging. As a result, the gas barrier properties are deteriorated.

Under such circumstances, as to a wrapping material, there has been a demand for developing a surface coating composition which is capable of forming a coating layer exhibiting excellent gas barrier properties, heat resistance, flexibility, transparency, moisture resistance, and resistance to solvent.

Figure 1:
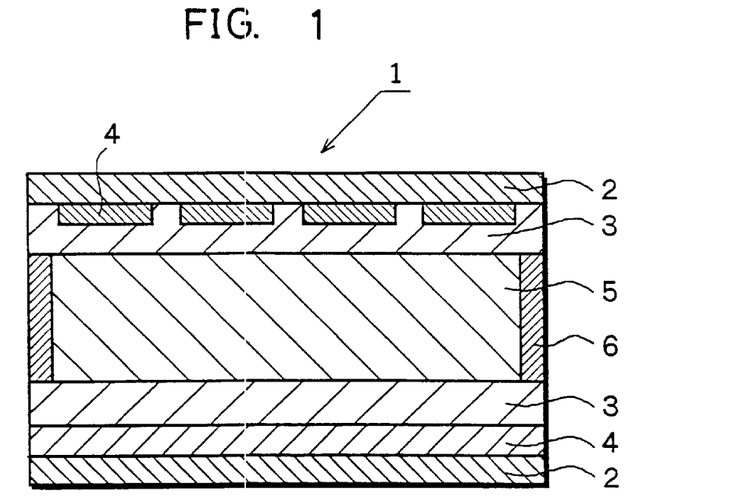
FIG. 1 is a cross-sectional view showing a structure of a conventional liquid crystal display device.

In a field of liquid crystal display devices as well, there has been a demand for the surface coating composition capable of forming a coating layer which exhibits excellent gas barrier properties. A liquid crystal display device is used in various applications such as watches, electric calculators, panels for automobiles, pager and the like. FIG. 1 is a diagram schematically showing a simplified structure of a liquid crystal display device. A liquid crystal display device 1 includes a cell formed by substrates 2, 2, alignment layers 3, 3, and transparent electrodes 4, 4, all of which are opposed to each other. The cell is filled with a liquid crystal composition 5 and is sealed by epoxy resin 6. As used in wider applications, the liquid crystal display device is required to have thin thickness and light weight at low production cost.

To satisfy such demands, recently, the substrates 2 are made of plastic film instead of glass in many cases. The substrates are required to be excellent in physical properties such as heat resistance, flexibility, transparency, moisture resistance, and resistance to solvent, and the substrate made of plastic film satisfies these requirements. In this case, however, there is a problem as follows. As described above, the liquid crystal composition 5 is sealed inside the cell formed by the substrates 2 opposed to each other under reduced pressure. If the plastic film has high gas permeability, it allows gases such as oxygen and nitrogen to pass therethrough, causing generation of air bubbles inside the cell.

To solve such a problem, it has been suggested to give the gas barrier properties to the plastic film used as a substrate. However, such a substrate is not adequate for a liquid crystal display device, because it has only poor moisture resistance and its gas barrier properties deteriorate in the presence of moisture.

Furthermore, in the recent situation where the liquid crystal display devices are used in wider applications, only the use of plastic film in stead of glass is not sufficient to satisfy the requirements of downsizing and low production cost of liquid crystal display devices. From such viewpoints, studies have been conducted to develop transparent electrodes, which are components indispensable for liquid crystal display devices, having thinner thickness. Currently, the transparent electrodes are mainly made of indium tin oxide (ITO) layer. The ITO layer is formed by providing ITO onto a transparent plastic film by a method such as coating and sputtering. In this case, an undercoat layer is interposed between the ITO layer and the transparent plastic film; otherwise, they do not sufficiently attach to each other. However, the presence of undercoat layer constitutes a restriction in realizing the thin thickness and low production cost of the liquid crystal display devices.

The prevent invention has been conducted to solve the above-described problems, and the objective thereof is to provide a surface coating composition which is capable of forming a coating layer having excellent gas barrier properties, heat resistance, flexibility, transparency, moisture resistance, resistance to solvent and the like.

The another objective thereof is: to provide a wrapping material for food, pharmaceuticals, electronic components; and to provide high-performance substrates for use in a liquid crystal display device. The substrate makes it possible to downsize the liquid crystal display devices.

SUMMARY OF THE INVENTION

According to the present invention, the surface treatment compound comprising:

An organometallic compound of the following formula (I) and/or a hydrolytic condensation product thereof:

$$R^1{}_m M(OR^2)_n \quad (I)$$

Wherein M is a metal element; $R^1$ is the same or different hydrogen atom, a lower alkyl group, an aryl group, a mercapto group directly bonded with a vinyl group or a carbon chain, or a methacryloyl group; $R^2$ is the same or different hydrogen atom, a lower alkyl group, or an acyl group; m is 0 or a positive integer; n is an integer of 1 or more; and (m+n) is equal to the valency of metal element M;

an organic compound (II) having a primary and/or secondary amino group in its molecule; and a compound (III) having a functional group reactable with the amino group in its molecule.

DETAILED DESCRIPTION OF THE PREFERRED EMBODIMENT

According to the present invention, the surface coating composition comprises:

An organometallic compound of the following formula (I) and/or a hydrolytic condensation product thereof:

$$R^1_m M(OR^2)_n \qquad (I)$$

Wherein M is a metal element; $R^1$ is the same or different hydrogen atom, a lower alkyl group, an aryl group, a mercapto group directly bonded with a vinyl group or a carbon chain, or a methacryloyl group; $R^2$ is the same or different hydrogen atom, a lower alkyl group, or an acyl group; m is 0 or a positive integer; n is an integer of 1 or more; and (m+n) is equal to the valency of metal element M;

an organic compound (II) having a primary and/or secondary amino group in its molecule; and a compound (III) having a functional group reactable with the amino group.

Preferably, the organic compound (II) is a high molecular organic compound, and the most preferably, is polyethyleneimines.

Preferably, the functional group reactable with the amino group in the compound (III) is an epoxy group. It is also preferable that the compound (III) also has an $Si(OR^3)$ group ($R^3$ is a hydrogen atom, a lower alkyl group, or an acyl group) together with the epoxy group.

Hereinafter, the present invention will be described in more detail.

An organometallic compound (I) is not specifically limited as far as it is a compound of the following formula (I):

$$R^1_m M(OR^2)_n \qquad (I)$$

Wherein M is a metal element; $R^1$ is the same or different hydrogen atom, a lower alkyl group, an aryl group, a mercapto group directly bonded with a vinyl group or a carbon chain, or a methacryloyl group; $R^2$ is the same or different hydrogen atom, a lower alkyl group, or an acyl group; m is 0 or a positive integer; n is an integer of 1 or more; an (m+n) is equal to the valency of metal element M.

Specific examples of the organometallic compound include: alkoxysilanes such as tetramethoxysilane, tetraethoxysilane, tetraisopropoxysilane, tetrabutoxysilane, methyltrimethoxysilane, methyltriethoxysilane, methyltriisopropoxysilane, methyltributoxysilane, ethyltrimethoxysilane, ethyltriethoxysilane, ethyltriisopropoxysilane, ethyltributoxysilane, dimethyldimethoxysilane, dimethyldiethoxysilane, dimethyldiisopropoxysilane, dimethyldibutoxysilane, diethyldimethoxysilane, diethyldiethoxysilane, diethyldiisopropoxysilane, diethyidibutoxysilane, vinyltrimethoxysilane, vinyltriethoxysilane, vinyltriisopropoxysilane, vinyltributoxysilane, γ-mercaptopropyltrimethoxysilane, γ-mercaptopropyltriethoxysilane, γ-methacryloxypropyltrimethoxysilane, γ-methacryloxypropyltriethoxysilane and the like; titanium alkoxides such as titanium tetraethoxide, titanium tetraisopropoxide, titanium tetrabutoxide and the like; zirconium alkoxides such as zirconium tetraethoxide, zirconium tetraisopropoxide, zirconium tetrabutoxide and the like; aluminum alkoxides such as aluminum triethoxide, aluminum triisopropoxide, aluminum tributoxide and the like, or the complex thereof; methyltriacetoxysilane; trimethylsilanol; and a high molecular organic compound including these compounds. These compounds may be used alone or in a mixture of two or more of them. Especially preferable are tetramemethoxysilane and tetraethoxysilane, because the formed coating layer exhibits an excellent moisture resistance.

In order to prevent the organometallic compound (I) from evaporating in the drying step of the coating layer formation, it is preferable that the organometallic compound (I) is subjected to hydrolytic condensation reaction before the applying step. Any known catalyst can be used for the hydrolytic condensation reaction. It is advantageous that the organometallic compound (I) is subjected to hydrolytic condensation reaction in a solvent which will be described later. When the compound (III) is a compound having an $Si(OR^3)$ group ($R^3$ is a hydrogen atom, a lower alkyl group, or an acyl group) such as an epoxy group-containing silane coupling agent or an isocyanate-containing silane coupling agent and the like, the compound (III) can be subjected to cohydrolytic condensation reaction together with the organometallic compound (I) prior to the applying step. The organometallic compound (I) has an effect of enhancing the moisture resistance of the formed coating layer.

The organic compound (II) has a primary and/or secondary amino group in its molecule. The organic compound (II) mainly has an effect of giving the flexibility to the formed coating layer. The organic compound (II) is required to have an amino group in its molecule in order to react with the compound (III). In this case, if the compound (II) has a hydrolytic group such as $Si(OR^3)$ group, the compound (II) reacts with the organometallic compound (I) and/or the compound (III) having an $Si(OR^3)$ group. This reaction results in forming a coating layer having too high degree of crosslinking, and therefore, the formed coating layer has poor flexibility. Due to the above reason, it is preferable that the organic compound (II) has no hydrolytic group such as $Si(OR^3)$ group.

Specific examples of the organic compound (II) include: low-molecular organic compounds such as allylamine, diallylamine, isopropylamine, diisopropylamine, imino-bispropylamine, ethylamine, diethylamine, 2-ethylhexylamine, 3-ethoxypropylamine, diisobutylamine, 3-diethylaminopropylamine, di-2-ethylhexylamine, dibutylaminopropylamine, propylamine, dimethylaminopropylamine, methyliminobispropylamine, 3-methoxypropylamine, ethylenediamine, 1,4-diaminobutane, 1,2-diaminopropane, 1,3-diaminopropane, hexamethylenediamine, ethanolamine, diethanolamine and the like; organic polymers, for example, polyethyleneimines such as Epomin series (EpominSP-003, EpominSP-006, EpominSP-012, EpominSP-018, EpominSP-103, EpominSP-110, EpominSP-200, EpominSP-300, EpominSP-1000, EpominSP-1020 and the like; product names, manufactured by Nippon Shokubai Co.); polyallylamine (for example, PAA-L, PAA-H, and the like; product names, manufactured by Nitto Boseki Co.); homopolymers of amino group-containing (meth)acrylate such as dimethylaminoethyl(meth)acrylate, diethylaminoethyl (meth)acrylate and the like; copolymers of amino group-containing (meth)acrylate and other (meth)acrylates or (meth)acrylic acid; and polyoxyethylenealkylamine and the like.

When the formed coating layer is used as a gas barrier coating layer, the organic compound (II) is preferably ethanolamine or a compound selected from the above-described organic polymers. In order to easily form a coating layer using the surface coating composition, the organic compound (II) is preferably a compound selected from the above-described organic polymers, and the most preferably, is polyethyleneimines. When the organic compound (II) is polyethyleneimines, the surface coating composition gains further stability before being applied onto a base material, and the formed coating layer exhibits more excellent gas barrier properties. When the organic compound (II) is an organic polymer, the preferable molecular weight thereof is in the range between 250 and 200,000, and more preferably in the range between 250 and 100,000. With the organic compound (II) having the molecular weight of less than 250, the formed coating layer may possibly have only poor flexibility. On the other hand, with the organic compound (II) having the molecular weight of more than 200,000, the formed coating layer may possibly have only poor transparency.

The compound (III) is not limited to a specific compound as far as it is a compound having a functional group reactable with the amino group contained in the organic compound (II). Examples of a functional group contained in the compound (III) include an epoxy group, a carboxyl group, an isocyanate group, an oxazolinyl group, a hydroxyl group, an alkoxysilyl group, and the like. The surface coating composition is required to contain the compound (III) to react with the organic compound (II), and at the same time, it has been found that the compound (III) has an effect of increasing the compatibility between the organometallic compound (I) and the organic compound (II). In addition, when the compound (III) has a hydrolyzable Si(OR$^3$) group (R$^3$ is a hydrogen atom, a lower alkyl group, or an acyl group: i.e., an alkoxysilyl group), the compound (III) undergoes hydrolytic condensation before or after the reaction with the compound (II), and simultaneously, undergoes (co)hydrolytic condensation with the hydrolyzable groups contained in the organometallic compound (I) so that condensation polymerization proceeds. In this manner, the tight coating layer can be quickly formed.

When the compound (II) is a low-molecular compound, the compound (III) preferably has a hydrolyzable group. In addition, the compound (III) is preferably subjected to hydrolytic condensation reaction (or (co)polymerization condensation reaction with the organometallic compound (I)) before or after the reaction between the amino group contained in the compound (II) and the functional group contained in the compound (III).

Specific examples of the compound (III) include: aliphatic diglycidyl ethers such as ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, 1,6-hexanediol diglycidyl ether, neopentyl glycol diglycidyl ether, glycerol diglycidyl ether and the like; polyglycidyl ethers such as glycerol triglycidyl ether, diglycerol triglycidyl ether, triglycidyl tris(2-hydroxyethyl) isocyanurate, trimethylolpropane triglycidyl ether, pentaerythritol tetraglycidyl ether and the like; aliphatic or aromatic diglycidyl esters such as diglycidyl adipate, diglycidyl o-phthalate and the like; glycidyl compounds having an aromatic ring or a hydrogenated ring thereof (including nucleus-substituted derivatives) such as bisphenol A diglycidyl ether, resorcinol diglycidyl ether, hydroquinone diglycidyl ether, bisphenol S diglycidyl ether, bisphenol F diglycidyl ether, compounds represented by the following formulae:

Chemical formula 1

-continued oligomers having glycidyl groups as functional groups such as bisphenol A diglycidyl ether oligomer represented by the following formula:

Chemical formula 2 n=0 or an interger of 1 or more isocyanates such as hexamethylene diisocyanate, tolylene diisocyanate, 1,4-diphenylmethane diisocyanate, 1,5-naphthalene diisocyanate, triphenylmethane triisocyanate, tolidine diisocyanate, xylyiene diisocyanate, dicyclohexylmethane diisocyanate and the like; dicarboxylic acids such as tartaric acid, adipic acid and the like; carboxyl group-containing polymers such as polyacrylic acid and the like; oxazolinyl group-containing polymers and the like; silane coupling agents having an epoxy group and an $Si(OR^3)$ group ($R^3$ is a hydrogen atom, a lower alkyl group, or an acyl group) such as β-(3,4-epoxycyclohexyl) ethyl-trimethoxysilane, β-(3,4-epoxycyclohexyl) ethyl-triethoxysilane, β-(3,4-epoxycyclohexyl) ethyl-triisopropoxysilane, β-(3,4-epoxycyclohexyl) ethyl-methyl-dimethoxysilane, β-(3,4-epoxycyclohexyl) ethyl-methyl-diethoxysilane, γ-glycidoxy-propyl-trimethoxysilane, γ-glycidoxy-propyl-triethoxysilane, γ-glycidoxy-propyl-triisopropoxysilane, γ-glycidoxy-propyl-methyl-dimethoxysilane, γ-glycidoxy-propyl-methyl-diethoxysilane and the like (hereinafter, these may be referred to as an epoxy group-containing silane coupling agent); and silane coupling agents having an isocyanate group and an $Si(OR^3)$ group ($R^3$ is a hydrogen atom, a lower alkyl group, or an acyl group) such as γ-isocyano-propyl-trimethoxysilane, γ-isocyano-propyl-triethoxysilane, γ-isociano-propyl-methyl-dimethoxysilane, γ-isocyano-propyl-methyl-diethoxysilane and the like (hereinafter, these may be referred to as an isocyanate group-containing silane coupling agent). These compounds may be used alone or in a mixture of two or more of them. Or alternatively, the compound (III) may be a high molecular organic compound having a functional group reactable with an amino group, or a high molecular organic compound having both such a functional group and an $Si(OR^3)$ group. There compounds may be used alone or in a mixture of two or more of them. Especially preferable as the compound (III) is epoxy group-containing silane coupling agent because it has excellent reactivity with an amino groups and is capable of forming a coating layer excellent in moisture resistance. When the epoxy group-containing silane coupling agent or the isocyanate group-containing silane coupling agent is used as the compound (III), the compound (III) can be subjected to hydrolytic condensation reaction before or after the reaction with the organic compound (II), and can be subjected to cohydrolytic condensation reaction with the organometallic compound (I). Among these compounds used as the compound (III), a compound having an aromatic ring or a hydrogenated ring thereof (including nucleus-substituted derivatives) is effective for further enhancing water resistance of a gas barrier layer.

According to the present invention, the surface coating composition includes the organometallic compound (I), the organic compound (II), and the compound (III) as essential components. These compounds can be reacted with each other in advance. These compounds (I), (II), and (III) may be independently present in the surface coating composition, and their respective reactant or hydrolytic condensation product may be present in the composition together.

The surface coating composition selectively includes a solvent which will be described later. Hereinafter, the preferable amount of the compounds (I), (II), and (III) respectively will be described, on assumption that the total amount of the compounds (I), (II), and (III) other than the solvent (that is, the solid concentration of the composition) is defined as 100 wt %.

The preferable amount of the organometallic compound (I) is in the range between 5 and 90 wt %. With the organometallic compound (I) in the amount of less than 5 wt %, the formed coating layer has only poor moisture resistance. Contrary to this, with the organometallic compound (III) in the amount of more than 90 wt %, the formed coating layer has only poor flexibility. The more preferable amount of the organometallic compound (I) is in the range between 20 and 90 wt %, and the most preferably in the range between 40 and 85 wt %.

The preferable amount of the organic compound (II) is in the range between 1 and 40 wt %. With the organic compound (II) in the amount of less than 1 wt %, the coating layer exhibits poor gas barrier properties when used as a gas barrier layer, and has only poor flexibility. Contrary to this, with the organic compound (II) in the amount of more than 40 wt %, the formed coating layer may possibly have only poor water resistance. The more preferable amount of the compound (II) is in the range between 5 and 30 wt %, and the most preferably in the range between 5 and 20 wt %.

The preferable amount of the compound (III) is in the range between 0.5 and 30 wt %. With the compound (III) in the amount of less than 0.5 wt %, the organic compound (II) and the organometallc compound (III) are not compatible with each other, and therefore, the formed coating layer has poor properties. Contrary to this, with the compound (III) in the amount more than 30 wt %, the surface coating composition has poor stability. The more preferable amount of the compound (III) is in the range between 1 and 20 wt %, and the most preferably 5 and 15 wt %.

The surface coating composition preferably contains a solvent. The solvent is not limited to a specific kind, and it is preferable to use a solvent which will dissolve or disperse the organometallic compound (I), the organic compound (II), and the compound (III). Examples of the solvent include: alcohols such as methanol, ethanol, 2-propanol, butanol, ethylene glycol and the like; ketones such as acetone, methyl ethyl ketone, methyl isobutyl ketone and the like; aromatic hydrocarbons such as toluene, benzene, xylene and the like; hydrocarbons such as hexane, heptane, octane and the like; esters such as ethyl acetate, butyl acetate and the like; and other solvents such as tetrahydrofuran, propyl ether, water and the like. These solvents may be used alone or in a mixture of two or more of them.

The method for preparing the surface coating composition is not specifically limited. In order to prepare the surface coating composition having high stability, the following methods are preferable. That is, the organic compound (II) and the compound (III) are reacted with each other, and then, the hydrolytic condensated organometallic compound (I) is added thereto. Or alternatively, the compound (III) and the organometallic compound (I) are reacted with each other in the presence of the organic compound (II) so as to be hydrolytic condensated (in this case, if the compound (III) has hydrolyzable groups, the compound (III) is also hydrolyzed.).

As far as the effect of the present invention is not impaired, the surface coating composition may be provided with various inorganic and organic additive agents such as a curing catalyst, a wettability improving agent, a plasticizer, a defoaming agent, a thickner, and the like.

The surface coating composition is applied onto the surface of the base material to form a coating layer through drying and curing processes. The base material is not specifically limited, and a resin molding is preferable. Examples of the resin molding include: polyolefin resins such as polyethylene, polypropylene and the like; polyester resins such as polyethylene terephthalate, polyethylene isophthalate, polyethylene-2,6-naphthalate, polybuthylene terephthalate, copolymers thereof and the like; polyamide resins; thermoplastic resins such as polystyrene, poly(meth) acrylate, polyacrylonitrile, polyvinyl acetate, polycarbonate, polyalylate, cellophane, polyimide, polyetherimide, polysulfone, polyetherketone, ionomer resins, fluororesins and the like; thermosetting resins such as melamine resins, polyurethane resins, epoxy resins, phenolic resins, unsaturated polyester resins, alkyd resins, urea resins, silicone resins and the like. The resin molding may be constituted with two or more of layers made of these resins.

In stead of the resin molding, the base material may be a metallic plate made of aluminum, stainless steel, steel, a material plated therewith, paper, fiber products, and the like.

The resin molding can be in the form of a film (or a sheet), a bottle and the like in accordance with its application. In the case of being used as a wrapping material and a substrate of liquid crystal display device, the resin molding is preferably in the form of film.

The method of applying the surface coating composition onto the base material is not specifically limited, and a roll coating method, a dip coating method, a bar coating method, a die coating method and the like or combination thereof is employed. Among these methods, a die coating method is preferable, because this method does not impair the stability of the surface coating composition. Before applying the surface coating composition, the base material can be subjected to surface activation treatment such as corona treatment or known anchoring treatments using an urethane resin and the like. After the surface coating composition is applied to the base material, other material may be further provided thereon, or other known treatments may be performed thereto.

After being applied to the base material, the applied layer of the surface coating composition is dried and cured. For rapid drying and curing, the applied layer is preferably heated at a temperature below the heat resistant temperature of the base material. For further rapid drying and curing, the applied layer is heated while being moisturized. In this case, the applied layer is heated and moisturized at 50° C. or more and 5% RH or more. The thickness of the coating layer after dried is preferably 0.01 to 20 $\mu$m, more preferably 0.1 to 15 $\mu$m, and the most preferably 0.5 to 10 $\mu$m. With a thickness of less than 0.01 $\mu$m, the coating layer is likely to have pinholes. A thickness of more than 20 $\mu$m is undesirable because cracks easily occur in the coating layer. When the surface coating composition is applied to the resin molding used as a base material to form a coating layer thereon, the resultant surface-treated resin molding generally has the oxygen permeability of 20 cc/m$^2$·24 hrs atm or less at 20° C. and 80% RH.

After the coating layer is formed on the surface of the resin molding, a deposited layer made of metals or metallic oxides may be further formed thereon. The deposited layer gives further gas barrier properties to the resin molding. The coating layer made of the surface coating composition firmly adheres to the deposited layer, and the excellent flexibility can be assured even with the deposited layer. The preferable metal for forming the deposited layer is aluminum, and the preferable metal oxide is silica or alumina. The deposition methods includes physical vapor deposition such as vacuum deposition, sputtering, and ion plating, chemical vapor deposition, and the like.

On the coating layer or the deposited layer, a thermoplastic resin layer having a single or a plurality of layers may be laminated. The thermoplastic resin layer enhances moisture resistance and performances such as heat sealing properties, printing properties, safety, and the like. In order to enhance the performances such as heat sealing properties and moisture resistance, preferably used as a thermoplastic resin are polyolefine resins for general purpose such as polyethylene, polypropylene, ethylene-vinyl acetate copolymer and the like. Also used as a thermoplastic resin are polystyrene, polyvinylidene chloride, polyethylene terephthalate, polyacrylonitrile, ethylene-vinyl alcohol copolymer, polyvinyl alcohol, cellophane, nylon and the like. Furthermore, onto the thermoplastic resin layer, polyvinylidene chloride may be coated.

The thermoplastic resin layer can be formed onto the surface-treated resin molding by known methods such as dry laminating using a known adhesive, extrusion laminating, hot melt laminating and the like. The adhesive is not limited to a specific kind, and examples thereof include polyurethane-system adhesive, polyester-system adhesive, epoxy-system adhesive, alkyl titanate-system adhesive, polyethyleneimine-system adhesive, polybutadiene-system adhesive, ethylene-vinyl acetate copolymer-system adhesive, a low-molecular polyethylene adhesive, wax, and the like. In order to firmly adhere the surface-treated resin molding and the thermoplastic resin layer, a surface treatment such as corona treatment may be conducted.

The surface-treated resin molding is especially preferable as a wrapping material. In this case, a plastic film is preferable as a base material. On the surface of the plastic film, a gas barrier layer made of the surface coating composition is formed. Although the thus-obtained surface-treated plastic film may be used as a wrapping material as it is, it is recommended to further laminate layers such as an nonpoisonous layer for ensuring safety, a layer for ensuring strength, a layer for achieving heat sealing, a layer on which printing can be conducted, a layer for achieving resistance to chemicals, a layer for shielding water vapor and the like.

The laminate layers may be formed on the plastic film used as a base material by methods such as coating, extruding, dry laminating, wet laminating, hot melt laminating and the like, and then, thus-structured plastic film is surface-treated to form a gas barrier layer thereon. Or alternatively, upon forming a gas barrier layer onto the plastic film, the surface of thus-obtained plastic film is further subjected to coating, deposition, laminating, and the like to form such layers thereon. It is also possible to laminate a plurality of plastic films formed with a gas barrier layer. Examples of the laminate layer include, in addition to the plastic film described above, known materials for use in wrapping such as wood, cloth, non-woven fabric, paper, synthetic paper, metal, metallic foil and the like. If necessary for laminating layers, any know adhesives can be used.

The wrapping material of the present invention include a gas barrier layer excellent in gas barrier properties, especially oxygen shielding properties, heat resistance, flexibility, transparency, moisture resistance, resistance to solvent and the like. Therefore, the wrapping material is preferably used for wrapping foods, because foods wrapped by the wrapping material are subjected to the severe conditions such as retorting, freezing, heating conducted after these treatments, and the like. Examples of foods to be wrapped with the wrapping material of the present invention include: uncooked or cooked meets, sea foods, vegetables, fruits and the like; retort pouch foods; frozen foods; proceeded foods such as sausage, ham, bacon, cheese and the like; cooked foods such as rice cake, pickles, raw (semi-raw) noodle, pizza and the like; dried foods such as tea, coffee, beef jerky, freeze dried foods, sweets and the like; paste foods such as tomato paste, chili sauce, jam and the like; semi-liquid foods such as mayonnaise, ketchup and the like; liquid foods such as oils, soy sauce, sauce, vinegar, liquor and other beverages and the like. Furthermore, the wrapping material of the present invention is also applicable for phamaceuticals and electronic components such as LSI, which require to be strictly kept from oxygen. Accordingly, the wrapping material of the present invention can be used in various applications.

On top of the use as a wrapping material, the surface-treated resin molding of the present invention is also used as substrates for interposing the liquid crystal cells of the liquid crystal display device. In this application, a transparent plastic film is used as a base material. Examples of the base material include: polyester such as polyethyleneterephthalate, polyethyleneisophthalate, polyethylene-2,6-naphthalate, polybutyleneterephthalate, copolymers thereof and the like; polycarbonate, polyethersulfone, polysulfone, polyether ketone, polyimide, polyetherimide, polyallylate and the like. These are preferable because of their transparency and excellent heat resistance. Furthermore, polycarbonate, polyethersulfone, and polyallylate are preferable because of their excellent heat resistance, optical character, transparency and the like. The thickness of the base material is not specifically limited, and preferably in the range between 10 and 500 $\mu$m. The base material having too small thickness cannot hold the liquid crystal composition. Contrary to this, the base material having too large thickness makes it impossible to render the liquid crystal display device to a thinner thickness.

The surface coating composition of the present invention is capable of forming a coating layer serving as a gas barrier layer. The gas barrier layer has extremely high adhesiveness to the ITO layer which forms transparent electrodes of the liquid crystal display device. Therefore, after the formation of the gas barrier layer, a thin layer made of transparent conductive material (i.e., a transparent conductive layer) can be directly formed onto the gas barrier layer. For the application where the thin thickness is not specifically required, an intermediate layer (such as an anchor coating layer and the like) can be interposed between the gas barrier layer and the transparent conductive layer.

A transparent conductive layer is generally made of ITO; however, may be made of other materials such as $SnO_2$-series material and ZnO-series material. The transparent conductive layer is formed by known methods such as deposition, sputtering, coating and the like. In order to form the transparent conductive layer without burdening the transparent plastic base film under the least burden, a method which can be conducted at low temperature (such as low voltage sputtering and the like) is recommended. The thickness of the transparent conductive layer is preferably in the range between 200 and 3000 Å.

The liquid crystal display device includes a pair of substrate for interposing a liquid crystal cell therebetween. It is enough that the respective substrates are formed with a transparent conductive layer, used as an electrode, only on one side opposed to each other. Therefore, when the surface-treated resin molding of the present invention is used as the substrates, it is enough that the gas barrier layer and the transparent conductive layer are formed only on its one side in this order. When a gas barrier layer is formed only on one side of the plastic film, the other side can be subjected to various treatments such as provision of a protection layer, if necessary.

Figure 2:
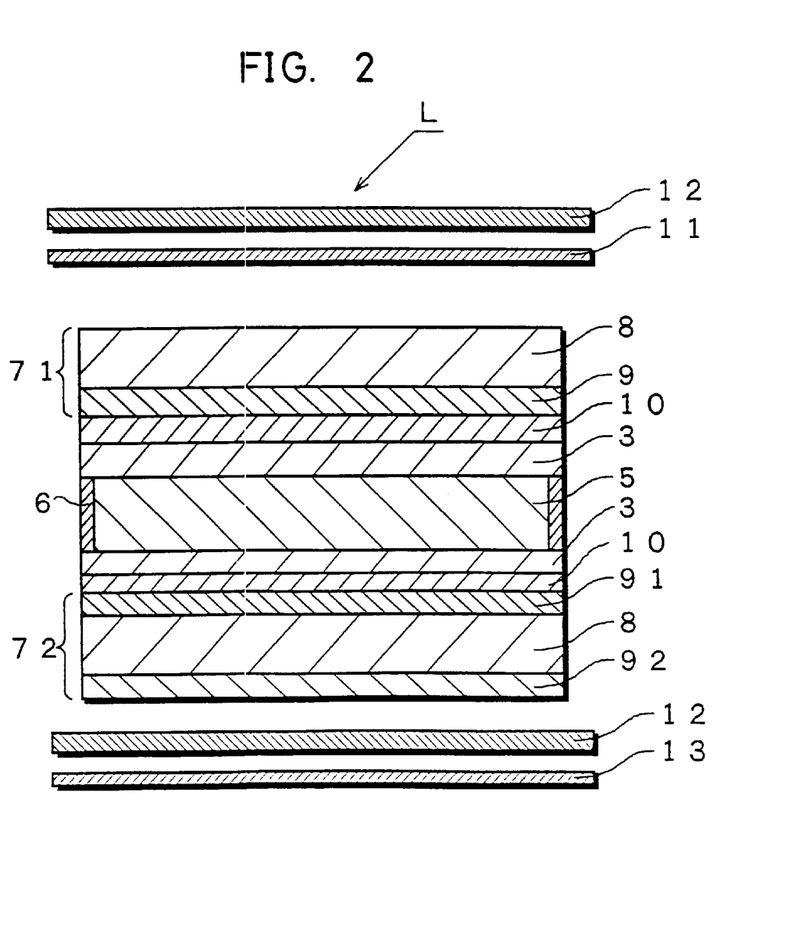
FIG. 2 is a cross-sectional view showing a structure of a liquid crystal display device including substrates of the present invention.

The substrates are used to interpose the liquid crystal cell therebetween. FIG. 2 is a diagram illustrating one example of a structure of liquid crystal display device L using the substrates of the present invention. It is understood that the substrates can be used in other structures. In FIG. 2, a substrate 71 comprises a base film 8 and a gas barrier layer 9 formed on the base film 8 on one side. On the gas barrier layer 9, a transparent conductive layer 10 are formed thereon and an alignment film 3 are laminated thereon in this order. On the other hand, a substrate 72 comprises a base film 8 and gas barrier layers 91, 92 formed on both sides of the base film 8. On the gas barrier layer 91, a transparent conductive layer 10 are formed thereon and an alignment film 3 are laminated thereon in this order. Thus-formed substrates 71, 72 interpose a liquid crystal cell filled with a liquid crystal composition 5, and the liquid crystal cell is sealed by epoxy resin 6. The resultant structure is further interposed between a compensating plate 11, polarizing plates 12, 12, and a counter substrate 13.

EXAMPLES

According to the present invention, the surface coating composition includes: an organometallic compound (I); an amino group-containing organic compound (II); and a compound (III) reactable with the organic compound (II). The surface coating composition is capable of forming a transparent coating layer excellent in gas barrier properties and flexibility when applied onto a base material such as a resin molding. The surface-treated resin molding exhibits excellent gas barrier properties, and is preferably used as a wrapping material and a substrate of liquid crystal display device.

Hereinafter, the present invention will be further described by way of the following examples. However, it is understood that the present invention is not limited thereto and modification and variation of the present invention is possible without departing from the spirit or scope of the invention.

The oxygen permeability was measured at 20° C. and 80% RH by the oxygen permeability measuring device manufactured by Mocon Co.

EXAMPLE 1

6.98 g of polyethylene imine "EpominSP-018" (product name, manufactured by Nippon Shokubai Co.) used as an organic compound (II), 9.25 g of γ-glycidoxypropyltrimethoxysilane (hereinafter, referred to as GTMS) used as a compound (III), and 25.1 g of methanol were mixed with each other, and the mixture was stirred at 65° C. for 3 hours under nitrogen. The resultant mixture was mixed with a mixture of 72.0 g of tetramethoxysilane (hereinafter, referred to as MS) used as an organometallic compound (I) and 11.1 g of methanol, and was stirred for 1 hour. As a result, a surface coating composition 1 was obtained. The surface coating composition 1 was applied onto a PET (polyethylene terephthalate) film having a thickness of 12 μm by a bar coater, and was dried at 80° C. for 30 seconds to form a coating layer. The coating layer was transparent, and had a thickness of 1.0 μm and the oxygen permeability of 2.1 cc/m$^2$·24 hrs·atm.

EXAMPLE 2

7.18 kg of polyethylene imine "EpominSP-018" used as an organic compound (II), 3.25 kg of GTMS used as a compound (III), and 21.1 kg of methanol were mixed with each other, and the resultant mixture was stirred at 65° C. for 3 hours under nitrogen. To the resultant mixture, a mixture of 5 kg of methanol and 0.1 kg of water was added dropwise at room temperature for 15 minutes, and then was stirred for 1 hour. The resultant mixture was mixed with a mixture of 52.0 kg of MS used as an organometallic compound (I) and 15.4 kg of methanol, and was stirred at room temperature for 3 hours. As a result, a surface coating composition 2 was obtained. The surface coating composition 2 was applied onto a PET film having a thickness of 12 μm at a coating speed of 10 m/min by a die coater equipped with a drying furnace of 3 m in length, and was dried at 100° C. and 20% RH to form a coating layer. The coating layer was transparent, and had a thickness of 2.5 μm and the oxygen permeability of 2.0 cc/m$^2$·24 hrs·atm.

EXAMPLE 3

7.22 g of polyethylene imine "EpominSP-300" (product name, manufactured by Nippon Shokubai Co.) used as an organic comopund (II), 3.25 g of GTMS used as a compound (III), 36.1 g of ethanol, and 72.0 g of tetraethoxysilane used as an organometallic compound (I) were mixed with each other, and the resultant mixture was stirred at 65° C. for 4 hours under nitrogen. As a result, a surface coating composition 3 was obtained. The surface coating composition 3 was applied onto a PET film having 12 μm by a bar coater, and was dried at 100° C. and 20% RH for 30 seconds to form a coating layer. The coating layer was transparent, and had a thickness of 2.4 μm and the oxygen permeability of 1.1 c/m$^2$·24 hrs·atm.

EXAMPLE 4

7.18 g of polyethylene imine "EpominSP-300" used as an organic compound (II), 4.72 g of β-(3,4-epoxycyclohexyl)ethyltrimethoxysilane used as a compound (III), and 21.1 g of methanol were mixed with each other, and the mixture was stirred at 55° C. for 2 hours under nitrogen. The resultant mixture was mixed with 55.0 g of MS used as an organometallic compound (I) and 15.4 g of methanol, and was stirred at room temperature for 1 hour. As a result, a surface coating composition 4 was obtained. The surface coating composition 4 was applied onto a PET film having a thickness of 12 μm by a bar coater, and was dried at 100° C. and 20% RH for 10 seconds to form a coating layer. The coating layer was transparent, and had a thickness of 2.7 μm and the oxygen permeability of 3.50 cc/m$^2$·24 hrs·atom.

EXAMPLE 5

6.89 g of polyethylene imine "EpominSP-006" (product name, manufactured by Nippon Shokubai Co.) used as an organic compound (II), 1.25 g of ethylene glycol diglycidyl ether used as a compound (III), and 80.0 g of methanol were mixed with each other, and the resultant mixture was stirred at 65° C. for 3 hours under nitrogen. The resultant mixture was mixed with 60.0 g of MS used as an organometallic compound (I), and was stirred for 1 hour. As a result, a surface coating composition 5 was obtained. The surface coating composition 5 was applied onto an OPP (biaxial oriented polypropylene) film having a thickness of 20 μm by a bar coater, and was dried at 80° C. for 30 seconds to form a coating layer. The coating layer was transparent, and had a thickness of 1.5 μm and the oxygen permeability of 5.3 cc/m$^2$·24 hrs·atm.

EXAMPLE 6

While vigorously stirring a mixture of 7.18 g of polyethylene imine "EpominSP-018" used as an organic compound (II) and 30.1 g of tetrahydrofuran, 1.25 g of hexamethylene diisocyanate used as a compound (III) was added thereto dripwise for 10 minutes, and was stirred at 65° C. for 3 hours under nitrogen. The resultant was mixed with a mixture of 49.0 g of MS used as an organometallic compound (I) and 15.4 g of tetrahydrofuran, and was stirred at room temperature for 1 hour. As a result, a surface coating composition 6 was obtained. The surface coating composition 6 was applied onto a PET film having a thickness of 12 μm by a bar coater, and was dried at 100° C. and 20% RH for 10 seconds to form a coating layer. The coating layer was transparent, and had a thickness of 4.5 μm and the oxygen permeability of 1.1 cc/m$^2$·24 hrs·atm.

EXAMPLE 7

7.22 g of polyethylene imine "EpominSP-018" used as an organic compound (II), 3.56 g of GTMS used as a compound (III), and 51.1 g of methanol were mixed with each other, and the mixture was stirred at 65° C. for 3 hours under nitrogen. The resultant mixture was mixed with a mixture of 52.0 g of MS (tetramethoxysilane) oligomer "M-silicate 51" (product name, manufactured by Tama Kagaku Kogyo Co., Ltd.) used as a hydrolytic condensation product of the organometallic compound (I) and 15.4 g of methanol, and was stirred at room temperature for 1 hour. As a result, a surface coating composition 7 was obtained. The surface coating composition 7 was applied onto a PET film having a thickness of 12 μm by a bar coater, and was dried at 100° C. and 20% RH for 10 seconds to form a coating layer. The coating layer was transparent, and had a thickness of 2.7 μm and the oxygen permeability of 1.3 cc/m$^2$·24 hrs·atm.

EXAMPLE 8

A mixture of 5.1 g of 2-aminoethanol used as an organic compound (II), 10 g of methanol, 2.1 g of GTMS used as a compound (III), and 20 g of toluene was heated at 65° C. for 2 hours. The resultant was mixed with 27.0 g of MS used as an organometallic compound (I), and was stirred at room temperature for 2 hours. As a result, a surface coating composition 8 was obtained. The surface coating composition was applied onto a PET film having a thickness of 12 μm, and was dried at 80° C. and 40% RH to form a coating layer. The coating layer was transparent, and had a thickness of 2.3 μm and the oxygen permeability of 1.8 cc/m$^2$·24 hrs·atm.

EXAMPLE 9

On the surface of the surface-treated film obtained in Example 1, an adhesive mixed with the urethane coating agents for adhesion "A310" and "A3" (product names, manufactured by Takeda Seiyaku Co.) at a ratio of 10:1 (weight ratio) was applied in such a manner that the thickness after being dried became 0.5 μm, and was dried. Then, to the resultant, a polypropylene having a thickness of 50 μm was attached. The obtained laminated structure had the oxygen permeability of 1.8 cc/m$^2$·24 hrs·atm.

EXAMPLE 10

352 g of polyethylene imine "EpominSP-018" used as an organic compound (II), 200 g of GTMS used as a compound (III), and 1000 g of methanol were mixed with each other, and the mixture was stirred at 65° C. for 3 hours under nitrogen. To the resultant, a mixture of 2500 g of MS used as an organometallic compound (I) and 750 g of methanol was added dropwise at 60° C. for 30 minutes, and was stirred for 1 hour. As a result, a surface coating composition 10 was obtained. The surface coating composition 10 was applied onto a PET film having a thickness of 12 μm in such a manner that the thickness after being dried became 3 μm, and was dried at 100° C. and 20% RH for 5 seconds to form a coating layer. Thus-formed surface-treated film was set in a high frequency induction heating-type deposition device, and silicon monoxide was deposited on the treated side of the film at rate of 80 m/min under vacuum of 10$^{-4}$Torr (1.33×10$^{-2}$Pa) to form a deposited layer. The thickness of deposited layer was 500 Å, and had the oxygen permeability of 0.4 cc/m$^2$·24 hrs·atm.

EXAMPLE 11

On the surface of the surface-treated film obtained in Example 10, an adhesive mixed with the urethane coating agents for adhesion "A310" and "A3" (product names, manufactured by Takeda Seiyaku Co.) at a ratio of 10:1 (weight ratio) was applied in such a manner that the thickness after being dried became 0.5 μm, and was dried. Then, to the resultant, a polypropylene film having a thickness of 50 μm was attached. The obtained laminated structure had the oxygen permeability of 0.3 cc/m$^2$·24 hrs·atm.

Comparative Example 1

7.18 g of polyethylene imine "Epomin SP-018" used as an organic compound (II), 3.73 g of GTMS used as a compound (III), and 51.1 g of methaol were mixed with each other, and was stirred at 65° C. for 3 hours under nitrogen. As a result, a surface coating composition 1 for comparison was obtained. The surface coating composition 1 for comparison was applied onto a PET film having a thickness of 12 μm by a bar coater, and was dried at 100° C. and 20% RH for 30 seconds to form a coating layer. The coating layer was transparent, and had a thickness of 2.5 μm and the oxygen permeability of 67.0 cc/m$^2$·24 hrs·atm. The coating layer had poor oxygen barrier since the surface coating composition 1 for comparison did not include the organometallic compound (I).

Comparative Example 2

7.18 g of polyethylene imine "EpominSP-012" (product name, manufactured by Nippon Shokubai Co.) used as an organic compound (II), 52.0 g of MS used as an organometallic compound (I), and 55.4 g of methanol were mixed with each other, and was stirred at 65° C. for 3 hours under nitrogen. As a result, a surface coating composition 2 for comparison was obtained. The surface coating composition 2 for comparison was applied onto a PET film having a thickness of 12 μm by a bar coater, and was dried at 100° C. and 20% RH for 10 seconds to form a coating layer. The coating layer was opaque, and had a thickness of 2.8 μm and the oxygen permeability of 69.0 cc/m$^2$·24 hrs·atm. The coating layer was opaque and had poor oxygen barrier, since the surface coating composition 2 for comparison did not include the compound (III) and therefore the compatibility between the organometallic compound (I) and the organic compound (II) was poor.

Comparative Example 3

5.25 g of GTMS used as a compound (III), 52.0 g of MS used as an organometallic compound (I), 30.4 g of methanol, 5.0 g of water and 0.5 g of HNO$_3$ were mixed with each other, and was stirred at 65° C. for 1 hour. As a result, a surface coating composition 3 for comparison was obtained. The surface coating composition 3 for comparison was applied onto a PET film having a thickness of 12 μm by a bar coater, and was dried at 100° C. and 20% RH for 5 minutes to form a coating layer. The coating layer was transparent, and had a thickness of 2.5 μm and the oxygen permeability of 72.0 cc/m$^2$·24 hrs·atm. A part of the coating layer was cracked. The coating layer had poor flexibility and oxygen barrier, since the surface coating composition 3 for comparison did not include the organic compound (II).

EXAMPLE 12

(evaluation when used as a wrapping material)

On the surface of the base material shown in Table 1, the surface coating composition 2 obtained in Example 2 was applied in such a manner that the thickness after being dried became 3 μm, and was dried at 100° C. and 10% RH for 5 seconds, and then aged at 50° C. for 2 days to form a gas barrier layer. On the gas barrier layer, a film shown in Table 1 was laminated by dry laminating method. Table 1 shows the oxygen permeability of the thus-formed laminate films obtained in each experiments.

Each laminate film was shaped in a bag form. Into each bag, each food shown in Table 1 was put and tightly heat sealed, and then, was retort sterilized under the conditions shown in Table 1. Upon leaving each food at 40% RH for 3 month, each food was eaten to examine the change in its taste and smell. The test results are shown in Table 1.

Table 1 also shows the test results for comparison obtained in the case of using a laminate film having no gas barrier layer. In Table 1, the respective codes represent the following meanings:

PET: polyethylene terephthalate

CPP: zero-ductility polypropylene

OPP: biaxial oriented polypropylene

EVA: polyethylene-vinyl acetate

LLDP: linear low density polyethylene form a coating layer. In this manner, a substrate for use in a liquid crystal display device was obtained. On one side of the substrate formed with the coating layer, ITO, a transparent conductive material, was sputtered to form an ITO transparent conductive layer to a thickness of 1000 Å. The physical properties of thus-structured substrate were evaluated based on the following standards. The test results are as shown in Table 2. In another experiment, in stead of polyalylate film, a polycarbonate film having a thickness of 100 μm was used, and the thickness of the ITO layer was changed to 500 Å. On the other hand, the comparative experiments were also made, where a plastic film onto which the surface coating composition was not applied was used. The evaluation results are also shown in Table 2.

TABLE 1

|  | Experiments of the present invention | | | Experiments for comparison | | | | |
| --- | --- | --- | --- | --- | --- | --- | --- | --- |
| Experiment No. | 1 | 2 | 3 | 4 | 5 | 6 | 7 | 8 |
| Base material and its thickness | PET 12 μm | OPP 20 μm | Nylon 15 μm | PET 12 μm | PET 12 μm | OPP 20 μm | Nylon 15 μm | Nylon 15 μm |
| Surface coating composition | Applied | Applied | Applied | Not applied | Not applied | Not applied | Not applied | Not applied |
| Laminated film and its thickness | EVA 20 μm | CPP 40 μm | CPP 40 μm | CPP 20 μm | EVA 20 μm | CPP 40 μm | CPP 20 μm | LLDP 40 μm |
| Wrapped food | Chili Sauce | Beef Jerky | Pickles | Pickles | Chili Sauce | Beef Jerky | Pickles | Pizza Base |
| Sterilizing conditions | 75° C. 10 min | 75° C. 10 min | 75° C. 10 min | 75° C. 10 min | 75° C. 10 min | 75° C. 10 min | 75° C. 10 min | 120° C. 10 min |
| Oxygen permeability of laminate film | 0.4 | 0.2 | 0.2 | 83 | 81 | >1000 | 38 | 40 |
| Change in taste and smell | None | None | None | Yes | Yes | Yes | Yes | Yes |

1) unit of oxygen permeability: cc/m$^2$ · 24 hrs · atm

As is obvious from Table 1, the wrapping materials of the present invention (Experiments Nos. 1 to 3) had low oxygen permeability and endured retorting treatment, and therefore, foods remained in an excellent condition. Contrary to this, wrapping materials for comparison (Experiments Nos. 4 to 8), without gas barrier layer, did not sufficiently shield foods from oxygen. As a result, the change in tastes and smells was observed in all foods.

EXAMPLE 13

(evaluation when used as a substrate of liquid crystal display device)

30.0 kg of MS (tetramethoxysilane) oligomer "M-silicate 51" used as an organometallic compound (I) was mixed with 5.0 kg of GTMS used as a compound (III), 30.0 kg of polyethylene imine "EpominSP-018" used as an organic compound (II), and 50.0 kg of methanol. The mixture was stirred and reacted at 65° C. for 2 hours under nitrogen. As a result, a surface coating composition was obtained.

The surface coating composition was applied onto both surfaces of a polyalylate film having a thickness of 75 μm to The evaluation results of the physical properties are as follows. The oxygen permeability (cc/m$^2$·24 hrs·atm) was evaluated by the same manner described above.

(transparency)

Mark ○ indicates that the transparency of the substrate formed with a gas barrier layer and a transparent conductive layer decreased by 10% or less as compared with that of a plastic film base material when full light was transmitted therethrough.

(adhesiveness)

The peeling test was conducted by adhering self-adhesive tape onto the respective substrates in a grid form. Mark ○ indicates that there was no peeling, and mark x indicates that there was peeling.

(resistance to solvent)

The respective substrates were soaked in γ-butyrolactone at 20° C. for 1 minute. Mark ○ indicates that there was no change in appearance, and mark x indicates that there was a change in appearance such as cloudiness and the like.

TABLE 2

|  | Experiments of the present invention | | Experiments for comparison | | |
|---|---|---|---|---|---|
| Experiment No. | 1 | 2 | 3 | 4 | 5 |
| Base material and its thickness | Polyalylate: 75 μm | Polycarbonate: 100 μm | Polycarbonate: 100 μm | Polyalylate: 75 μm | Polycarbonate: 100 μm |
| Surface coating composition | applied | Applied | Not applied | Not applied | Not Applied |
| Transparent conductive layer (Å) | ITO 1000 | ITO 500 | None | None | ITO 500 |
| Transparency | ○ | ○ | ○ | ○ | ○ |
| Adhesivness | ○ | ○ | — | — | x |
| Oxygen permeability | <0.1 | <0.1 | >1000 | >1000 | >1000 |
| Resistance to solvent | ○ | ○ | x | x | x |

Unit of oxygen permeability: cc/m$^2$ · 24 hrs · atm

What is claimed is:

1. A surface coating composition, comprising:

an organometallic compound of the formula (I) and/or a hydrolytic condensation product thereof:

$$R^1{}_m(M(OR^2)_n \qquad (I)$$

wherein M is a metal element; each $R^1$ is, independently, a hydrogen atom, a lower alkyl group, an ally group, a mercapto group directly bonded with a vinyl group of a carbon chain, or methacryloyl group; each $R^2$ is, independently, a hydrogen atom, a lower alkyl group, or an acyl group; m is 0 or a positive integer; n is an integer of 1 or more; and (m+n) is equal to the valency of metal element M;

an organic polymer (II) having a primary and/or secondary amino group, wherein the polymer (II) does not have a hydrolytic group and has a molecular weight in the range of 250 to 200,000; and a compound (III) having a functional group reactable with the amino group of the polymer (II), wherein the compound (III) does not have a primary or secondary amino group.

2. A surface coating composition according to claim 1, wherein the organic compound (II) is polyethylene imine.

3. A surface coating composition according to claim 1, wherein the compound (III) has an epoxy group as the functional group reactable with an amino group.

4. A surface coating composition according to claim 1, wherein the compound (III) has an epoxy group and an Si(OR$^3$) group, where $R^3$ is a hydrogen atom, a lower alkyl group or an acyl group.

5. A surface-treated resin molding comprising a resin molding and a coating layer made of the surface coating composition of claim 1, the coating layer being formed on at least one side of the resin molding.

6. A surface-treated molding according to claim 5, having an oxygen permeability of 20 cc/m$^2$·24 hrs·atm or lower at 20° C. and 80% RH.

7. A wrapping material comprising a resin molding and a coating layer made of the surface coating composition of claim 1, the coating layer being formed on at least one side of the resin molding.

8. A wrapping material according to claim 7, wherein the wrapping material is used for wrapping foods.

9. A substrate of liquid crystal display device comprising a resin molding and a coating layer made of the surface coating composition of claim 1, the coating layer being formed on at least one side of the resin molding.

10. A substrate of liquid crystal display device comprising a resin molding and a coating layer made of the surface coating composition of claim 1, the coating layer being formed on at least one side of the resin molding, wherein a transparent conductive thin layer is further formed on the coating layer.

11. A liquid crystal display device comprising the substrate of claim 8 or 9.

12. The surface coating composition according to claim 1, wherein the hydrolytic group is a Si(OR$^3$) group.

13. The surface coating composition of claim 1, wherein the organic polymer (II) is a polyethyleneimine, a polyallylamine, a homopolymer of amino group-containing (meth)acrylate monomers, a copolymer of amino group-containing (meth)acrylate monomers and other (meth) acrylate monomers or (meth)acrylic acid, or a polyoxyethylenealkylamine.

14. The surface coating composition of claim 1, wherein the compound (III) is an aliphatic diglycidyl ether, a polyglycidyl ether, an aliphatic or aromatic diglycidyl ester, a glycidyl compound having an aromatic ring or a hydrogenated ring thereof.

15. The surface coating composition of claim 1, wherein the compound (III) is represented by the formula -continued n=0 or an interger of 1 or more.

16. The surface coating composition of claim 1, wherein the compound (III) is an isocyanate, a dicarboxylic acid, an oxazolinyl group-containing polymer, a silane coupling agents having an epoxy group and an $Si(OR^3)$ group, wherein $R^3$ is a hydrogen atom, a lower alkyl group, or an acyl group, or a silane coupling agent having an isocyanate group and an $Si(OR^3)$ group, wherein $R^3$ is a hydrogen atom, a lower alkyl group, or an acyl group.

17. The surface coating composition of claim 1, wherein the metal element in the formula of compound (I) is silicon, aluminum or zirconium.

18. The surface coating composition of claim 1, wherein the compound (I) is tetramethoxysilane, tetraethoxysilane, tetraisopropoxysilane, tetrabutoxysilane, methyltrimethoxysilane, methyltriethoxysilane, methyltriisopropoxysilane, methyltributoxysilane, ethyltrimethoxysilane, ethyltriethoxysilane, ethyltriisopropoxysilane, ethyltributoxysilane, dimethyldimethoxysilane, dimethyidiethoxysilane, dimethyidiisopropoxysilane, dimethyidibutoxysilane, diethyldimethoxysilane, diethyldiethoxysilane, diethyldiisopropoxysilane, diethyldibutoxysilane, vinyltrimethoxysilane, vinyltriethoxysilane, vinyltriisopropoxysilane, vinyltributoxysilane, γ-mercaptopropyltrimethoxysilane, γ-mercaptopropyltriethoxysilane, γ-methacryloxypropyltrimethoxysilane, γ-methacryloxypropyltriethoxysilane, titanium tetraethoxide, titanium tetraisopropoxide, titanium tetrabutoxide, zirconium tetraethoxide, zirconium tetraisopropoxide, zirconium tetrabutoxide, aluminum triethoxide, aluminum triisopropoxide, aluminum tributoxide, methyltriacetoxysilane or trimethylsilanol.

19. The surface coating composition of claim 1, further comprising a solvent.

20. The surface coating composition of claim 1, comprising:
   between 5 and 90 wt. % of compound (I),
   between 1 and 40 wt. % of the organic compound (II), and
   between 0.5 and 30 wt. % of compound (III).

21. A coated surface obtained by applying the surface coating composition according to claim 1 to a surface.

22. A coating composition obtained by combining:
   an organometallic compound of the formula (I) and/or a hydrolytic condensation product thereof:

$$R^1_m(M(OR^2))_n \qquad (I)$$

wherein M is a metal element; each $R^1$ is, independently, a hydrogen atom, a lower alkyl group, an ally group, a mercapto group directly bonded with a vinyl group of a carbon chain, or methacryloyl group; each $R^2$ is, independently, a hydrogen atom, a lower alkyl group, or an acyl group; m is 0 or a positive integer; n is an integer of 1 or more; and (m+n) is equal to the valency of metal element M;

an organic polymer (II) having a primary and/or secondary amino group, wherein the polymer (II) does not have a hydrolytic group and has a molecular weight in the range of 250 to 200,000; and a compound (III) having a functional group reactable with the amino group of the polymer (II), wherein the compound (III) does not have a primary or secondary amino group.

* * * * *